United States Patent [19]

Harada et al.

[11] Patent Number: 4,831,091

[45] Date of Patent: May 16, 1989

[54] PROCESS FOR POLYMERIZING OLEFINS

[75] Inventors: Masato Harada, Kisarazushi; Makoto Iijima; Noriaki Saito, both of Ichiharashi, all of Japan

[73] Assignee: Chisso Corporation, Osaka, Japan

[21] Appl. No.: 226,729

[22] Filed: Aug. 1, 1988

Related U.S. Application Data

[63] Continuation of Ser. No. 121,856, Nov. 17, 1987, abandoned, which is a continuation of Ser. No. 58,125, Jun. 4, 1987, abandoned, which is a continuation of Ser. No. 828,264, Feb. 11, 1986, abandoned.

[30] Foreign Application Priority Data

Mar. 14, 1985 [JP] Japan .................................. 60-51507

[51] Int. Cl.$^4$ ........................... C08F 4/64; C08F 10/06
[52] U.S. Cl. ...................... 526/119; 502/127; 526/125; 526/351; 526/901
[58] Field of Search ........................ 526/125, 119

[56] References Cited

U.S. PATENT DOCUMENTS

| | | | |
|---|---|---|---|
| 4,187,196 | 2/1980 | Giannini et al. | 526/125 |
| 4,472,524 | 9/1984 | Albizzati et al. | 526/125 |
| 4,522,930 | 6/1985 | Albizzati et al. | 526/125 |
| 4,551,439 | 11/1985 | Harada et al. | 526/125 |

FOREIGN PATENT DOCUMENTS 2111066 6/1983 United Kingdom ................ 526/125

*Primary Examiner*—Edward J. Smith
*Attorney, Agent, or Firm*—Fred Philpitt

[57] ABSTRACT

A process for producing polyolefins having a high stereoregularity, no smell and a good particulate form, without needing removal of catalyst residue contained in the resulting polyolefins, which process comprises polymerizing olefins by the use of a catalyst obtained by combining a solid product (II) as a solid catalyst component prepared through the following reaction steps I, II and III, with an organoaluminum compound component and an organic silicon compound component having Si-O-C bond: Step I of mixing and dissolving ⓐ an anhydrous Mg dihalide, ⓑ a specified orthotitanic acid ester or/and a specified polytitanic acid ester and ⓒ a saturated or unsaturated, mono- or polyhydroxy alcohol of 1~20 C in an inert hydrocarbon solvent to obtain a component (A), Step II of mixing (A) with a component (B) consisting of ⓓ an aliphatic or aromatic monocarboxylic acid ester, ⓔ a specified halogenated aluminum and ⓕ a specified halogenated silicon to obtain a solid product (I), and Step III of reacting (I) with a component (C) consisting of ⓖ a specified halogenated titanium or/and ⓗ a specified halogenated vanadyl or a specified vanadium halide to obtain the solid product (II).

2 Claims, No Drawings

PROCESS FOR POLYMERIZING OLEFINS

This is a continuation of application Ser. No. 121,856, filed Nov. 17, 1987 which was a continuation of Ser. No. 058,125, filed June 4, 1987 which was a continuation of Ser. No. 828,264, filed Feb. 11, 1986, all now abandoned.

BACKGROUND OF THE INVENTION

1. Field of the Invention

This invention relates to a process for producing polyolefins. More particularly it relates to a process for producing an odorless polyolefin by the use of a novel supported type solid catalyst. Polyolefins referred to herein mean homopolymers and copolymers of α-olefins having 3 or more carbon aooms, and also copolymers of α-oleiins having 3 or more carbon atoms with an α-olefin having two carbon atoms, the proportion of the former oomponent in the copolymers being 50% by weight or greater.

2. Description of the Prior Art

Heretofore as to the trend of improvement in the Ziegler-Natta type catalysts, it has been known that when a supported type solid catalyst component is combined with an organoaluminum compound component and an aromatic carboxylic acid ester component, the resulting polyolefin has an enhanced stereoregularity. For example, as disclosed in Japanese Patent Application Laid-Open Nos. Sho 57-74307/1982 and Sho 58-32604/1983, there is known a process wherein an aromatic carboxylic acid ester is added as a catalyst component to improve the stereoregularity of the resulting polyolefin. However, when polyolefins are produced according to gas phase polymerization wherein no solvent is used in principle, an aromatic carboxylic acid ester as a component of the catalyst is to be totally contained in the produced polyolefins. Further, it is well known that aromatic carboxylic acid esters give off a strong smell even when they are present in a slightest quantity. Thus, when polyolefins are produced according to gas phase polymerization using an aroamtic carboxylic acid ester as a catalyst component, the resulting polyolefins contain the aromatic carboxylic acid ester or a compound into which the ester has been converted during the polymerization process, and give off a strong smell during the storage of the polyolefins and during the granulation step of the polyolefins. This may raise a problem of environmental pollution in the case of polyolefin production on a commercial scale.

On the other hand, Japanese Patent Application Laid-Open No. Sho 58-83006/1983 discloses a process for producing polyolefins by the use of a catalyst formed by combining a supported type solid catalyst component with an organometal compound component and an organic silicon compound component having a Si—O—C or Si—N—O bond. In the case of this prior application, it is an indispensable requirement that the supported type solid catalyst component to be combined with the organic silicon componnd component contains a polybasic carboxylic acid ester and/or a polyvalent hydroxyl compound ester. However, it has not yet been known that even when a supported type solid catalyst containing an aromatic monocarboxyiic acid ester is combined with an ogganic silicon compound component having Si—O—C bond, the stereoregularity of the resulting polyolefins is improved. In addition, the organic silicon compound having Si—O—C bond gives off a weak smell and has a nature that it reacts relatively easily with the atmospheric moisture and is decomposed into an odorless compound. Thus, even when an organic silicon compound having Si—O—C bond is contained in a small quantity in polyolefins, such polyolefins are odorless.

The present inventors have made extensive research in order to solve the above problems of the environmental pollution and operational difficulty based on the strong smell, and as a result, have found that when a novel solid catalyst component containing an aromatic monocarboxylic acid ester is combined with an orgaoaluminum compound component and an organic silicon compound component having Si—O—C bond, the resulting catalyst has a high polymerization activity to such an extent that, when the catalyst is used for olefin polymerization, it is unnecessary to remove the catalyst residue contained in the resulting polymer, and the polymer afforded by this catalyst has a high stereoregularity, no smell and a good particulate form.

As apparent from the foregoing, the object of the present invention is to provide a process for producing polyolefins having a high stereoregularity, no smell and a good particulate form, without needing removal of catalyst residue contained in the resulting polyolefins.

SUMMARY OF THE INVENTION

The present invention has the following main constitution (1):

(1) a process for polymerizing olefins by the use of a catalyst obtained by combining a solid product (II) as a solid catalyst component prepared through the following reaction steps I, II and III, with an organoaluminum compound component and an organic silicon compound component having Si—O—C bond:

Step I of mixing and dissolving ⓐ anhydrous magnesium dihalide, ⓑ an orthotitanic acid ester expressed by the formula Ti(OR$^1$)$_4$ or/and a polytitanic acid ester expressed by the formula $$R^2 \!\!+\!\! O \!\!-\!\! Ti(OR^3)(OR^4)_{\overline{m}} O \!\!-\!\! R^5$$ 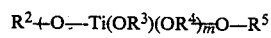

wherein R$^1$, R$^2$, R$^3$, R$^4$ and R$^5$ each represent an alkyl group or an aryl group each of 1 to 20 carbon atoms or a cycloalkyl group of 3 to 20 carbon atoms and m represents a number of 2 to 20, and ⓒ a saturated or unsaturated, monohydroxy or polyhydroxy alcohol of 1 to 20 carbon atoms, in an inert hydrocarbon solvent to obtain a component (A);

Step II of subjecting this component (A) to a mixing reaction with a component (B) consisting of ⓓ an aliphatic or aromatic monocarboxylic acid ester (hereinafter referred to as organic acid ester) each of 2 to 24 carbon atoms, ⓔ a halogenated aluminum expressed by the formula AlX$_n$R$^8_{3-n}$ wherein X represents Cl or Br, R$^8$ represents an alkyl group or an aryl group each of 1 to 20 carbon atoms or a cycloalkyl group of 3 to 20 carbon atoms and n represents a number of 0 to 3, and ⓕ a halogenated silicon expressed by the formula SiX$_l$R$^6_{4-l}$ or SiX$_p$(OR$^7$)$_{4-p}$ wherein X represents Cl or Br, R$^6$ and R$^7$ each represent an alkyl group or an aryl group each of 1 to 20 carbon atoms or a cycloalkyl group of 3 to 20 carbon atoms and l and p each represents a number of 1 to 4, to deposit solids (hereinafter referred to as solid product (I)); and Step III of reacting this solid product (I) with a component (C) consisting of ⓖ a halogenated titanium expressed by the general formula TiX$_q$(OR$^9$)$_{4-q}$ wherein X represents Cl or Br, $R^9$ means an alkyl group or an aryl group each of 1 to 20 carbon atoms or a cycloalkyl group of 3 to 20 carbon atoms or/and ⓗ a halogenated vanadyl or/and a vanadium halide expressed by the general formula $VOX_s(OR^{10})_{3-s}$ or $VX_t(OR^{11})_{4-t}$ wherein X represents Cl or Br, $R^{10}$ and $R^{11}$ each represent an alkyl group or an aryl group each of 1 to 20 carbon atoms or a cycloalkyl group of 3 to 20 carbon atoms, s represents a number of 1 to 3 and t represents a number of 1 to 4, to obtain solids (hereinafter referred to as solid product (II)).

DESCRIPTION OF PREFERRED EMBODIMENTS

The constitution and effectiveness of the present invention will be described below in more detail.

First the above component (A) will be mentioned. The component (A) is obtained by reacting and dissolving the above components ⓐ, ⓑ and ⓒ in an inert hydrocarbon. The component ⓐ is an anhydrous magnesium dihalide. As the anhydrous magnesium dihalides, anhydrous magnesium chloride or anhydrous magnesium bromide may be used. Such "anhydrous" compounds may be those containing a slightest quantity of moisture to the same extent as that of commercially available products sold as these "anhydrous" compounds. The component ⓑ is a titanic acid ester, which includes an orthotitanic acid ester expressed by $Ti(OR^1)_4$ and a polytitanic acid ester —O—expressed by $R^2$—O—$Ti(OR^3)(OR^4)_m R^3$, $R^4$ and $R^5$ each represent an alkyl group or an aryl group each of 1 to 20 carbon atoms or a cycloalkyl group of 3 to 20 carbon atoms and m represents a number of 2 to 20. Concrete examples thereof are orthotitanic acid esters such as methyl orthotitanate, ethyl orthotitanate, n-propyl orthotitanate, i-propyl orthotitanate, n-butyl orthotitanate, i-butyl orthotitanate, n-amyl orthotitanate, 2-ethylhexyl orthotitanate, n-octyl orthotitanate, phenyl orthotitanate, cyclohexyl orthotitanate, etc., and polytitanic acid esters such as methyl polytitanate, ethyl polytitanate, n-propyl polytitanate, i-propyl polytitanate, n-butyl polytitanate, i-butyl polytitanate, n-amyl polytitanate, 2-ethylhexyl polytitanate, n-octyl polytitanate, phenyl polytitanate, cyclohexyl polytitanate, etc. The component ⓒ is an alcohol.

As to the alcohol, aliphatic saturated or unsaturated alcohols may be used. Concrete examples are monohydroxy alcohols such as methyl alcohol, ethyl alcohol, n-propyl alcohol, i-propyl alcohol, n-butyl alcohol, n-amyl alcohol, i-amyl alcohol, n-hexyl alcohol, n-octyl alcohol, 2-ethylhexyl alcohol, allyl alcohol, etc., and polyhydroxy alcohols such as ethylene glycol, trimethylene glycol, glycerine, etc. Among these, aliphatic saturated alcohols of 4 to 10 carbon atoms are preferred.

Examples of the inert hydrocarbon solvent used for dissolving the components ⓐ, ⓑ and ⓒ are aliphatic hydrocarbons such as pentane, hexane, heptane, nonane, decane, kerosine, etc., aromatic hydrocarbons such as benzene, toluene, xylene, etc., and halogenated hydrocarbons such as carbon tetrachloride, 1,2-dichloroethane, 1,1,2-trichloroethane, chlorobenzene, o-dichlorobenzene, etc. Among these, aliphatic hydrocarbons are preferred.

As concrete processes for reacting and dissolving the components ⓐ, ⓑ and ⓒ in an inert hydrocarbon solvent, the following are exemplified:

① The components ⓐ, ⓑ and ⓒ are mixed in an inert hydrocarbon solvent in an optional addition order, and the resulting suspension is heated with stirring.

② The components ⓑ and ⓒ are heated in an inert hydrocarbon solvent with stirring, and to the resulting solution is added the component ⓐ.

③ The components ⓐ and ⓑ are heated in an inert hydrocarbon solvent with stirring, followed by adding the component ⓒ.

④ The components ⓐ and ⓒ are heated in an inert hydrocarbon solvent with stirring, followed by adding the component ⓑ.

Any of these processes may be employed, but the process ① is preferred in that the operation is very easy. In order to dissolve the components ⓐ, ⓑ and ⓒ in an inert hydrocarbon solvent, heating is necessary. The heating temperature is in the range of 40° to 200° C., preferably 50° to 150° C. The time required for the reaction and dissolution is in the range of 5 minutes to 7 hours, preferably 10 minutes to 5 hours. The quantity of the component ⓑ used is 0.1 to 2 mols, preferably 0.5 to 1.5 mol, per mol of component ⓐ when the component ⓑ is an orthotitanic acid ester, while in the case of a polytitanic acid ester, the corresponding quantity of the orthotitanic acid ester as calculated into orthotitanic acid ester may be used. The quantity of the component ⓒ used is 0.1 to 5 mols, preferably 0.5 to 4 mols, per mol of the component ⓐ.

As to the quantities of the components ⓑ and ⓒ used, the more the quantities based on the component ⓐ, the easier the dissolution, but when the component ⓐ is dissolved in such a manner, it is not only necessary for solidifying the component (A) to use a very large quantity of a halogenated silicon, but also the solidification itself becomes difficult, and even when solidified, it is very difficult to control the particulate shape. Further, if the quantities of the components ⓑ and ⓒ used are too small, the component ⓐ is insoluble in inert hydrocarbon solvents; the resulting solid catalyst component is amorphous; and it is impossible to obtain a polymer having a particulate shape of sphere or close to sphere. The quantity of the inert hydrocarbon solvent used is 0.1 to 5 l, preferably 0.3 to 3 l, per mol of the component ⓐ.

Next, the component (B) will be described. The component (B) consists of the components ⓓ, ⓔ and ⓕ. The component ⓓ is an organic acid ester. Examples of the organic acid ester used are aliphatic carboxylic acid esters such as methyl acetate, ethyl acetate, n-propyl acetate, i-propyl acetate, n-butyl acetate, ethyl propionate, n-propyl propionate, i-butyl propionate, ethyl butyrate, phenyl acetate, etc., and aromatic carboxylic acid esters such as methyl benzoate, ethyl benzoate, methyl toluylate, ethyl toluylate, methyl anisate, ethyl anisate, phenyl anisate, etc. The component ⓔ is a halogenated aluminum expressed by the formula $AlX_n R^8_{3-n}$ wherein X represents Cl or Br; $R^8$ represents an alkyl group or an aryl group each of 1 to 20 carbon atoms or a cycloalkyl group of 3 to 20 carbon atoms; and n represents a number of 0 to 3. Concrete examples thereof are aluminum trichloride, ethylaluminum dichloride, butylaluminum dichloride, ethylaluminum sesquichloride, diethylaluminum chloride, dipropylaluminum chloride, triethylaluminum, tributylaluminum, diphenylaluminum chloride, dicyclohexylaluminum chloride, aluminum tribromide, ethylaluminum dibromide, etc. The component ⓕ is a halogenated silicon expressed by the formulas $SiX_lR^6{}_{4-l}$ or $SiX_p(OR^7)_{4-p}$ wherein X is Cl or Br; $R^6$ and $R^7$ each represents an alkyl group or an aryl group each of 1 to 20 carbon atoms or a cycloalkyl group of 3 to 20 carbon atoms; and l and p each represent a number of 1 to 4.

Concrete examples of $SiX_lR^6{}_{4-l}$ are $SiCl_4$, $SiBr_4$, ethylsilicon trichloride, propylsilicon trichloride, butylsilicon trichloride, phenylsilicon trichloride, cyclohexylsilicon trichloride, ethylsilicon tribromide, diethylsilicon dichloride, dibutylsilicon dichloride, triethylsilicon chloride, etc. Concrete examples of $SiX_p(OR^7)_{4-p}$ are $SiCl_4$, $SiBr_4$, methoxysilicon trichloride, ethoxysilicon trichloride, propoxysilicon trichloride, butoxysilicon trichloride, phenoxysilicon trichloride, ethoxysilicon tribromide, diethoxysilicon dichloride, diethoxysilicon dichloride, dibutoxysilicon dichloride, diphenoxysilicon dichloride, dimethoxysilicon dibromide, trimethoxysilicon chloride, triethoxysilicon chloride, etc. Further, mixtures of the foregoing compounds may be used. Among these, $SiCl_4$ is preferred. These components may be diluted for use by the above-mentioned inert hydrocarbon solvents.

Next, the reaction of the component (A) with the component (B) will be described. When the component (A) is reacted with the component (B), the solid product (I) is obtained. This reaction may be roughly classified as follows:

a. The component (B) is added to the component (A).
b. The component (A) is added to the component (B).
c. A portion of the component (B) is added to the component (A), followed by adding to the mixture the remaining portion of the component (B) or adding the mixture to the remaining portion of the component (B).

Concretely the following processes ①~⑥ are illustrated:

① The component ⓓ and successively or at the same time the component e are reacted with the component (A), followed by reacting the component ⓕ to deposit the solid product (I).

② The components ⓓ, ⓔ and ⓕ are at the same time reacted with the component (A) to deposit the solid product (I).

③ The component ⓕ is reacted with the component (A) to deposit solids, followed by reacting the component ⓓ and successively or at the same time the component ⓔ to obtain the solid product (I).

④ A mixture and/or a reaction product of the component ⓓ with the component ⓔ is reacted with the component (A), followed by reacting the component ⓕ to deposit the reaction product (I).

⑤ The component ⓕ is reacted with the component (A) to deposit solids, followed by reacting a mixture and/or a reaction product of the component ⓓ with the component ⓔ to obtain the solid product (I).

⑥ Combinations of any two or more of the processes ①~⑤.

Even if the component ⓓ and/or the component ⓔ is mixed or reacted with the component (A), no solids are deposited. The component (A) or the mixture or the reaction product of the component (A) with the component ⓓ and/or the component ⓔ is a uniform solution. In order to deposit solids from these uniform solutions, the component ⓕ is required. As to the addition manners in the above processes ①~⑥, the component ⓓ and the component ⓔ are usually preferred to add to the component (A), but the component ⓕ may be added to the component (A) or (A) may be added to (f). The particulate shape of the solid product (II) is ruled by that of the solid product (I); hence for controlling the particulate shape, the reaction between the component ⓕ and the component (A) or a mixture or reaction product of the component (A) with the component (d) and/or the component ⓔ is very important.

The proportions of the components ⓓ, ⓔ and ⓕ used relative to the component (A) are as follows:

Based on one mol of the component ⓐ used as a raw material for constituting the component (A), the quantity of the component ⓓ used is 0.05 to 0.7 mol, preferably 0.1 to 0.6 mol, that of the component ⓔ is 0.005 to 0.5 mol, preferably 0.01 to 0.4 mol and that of the component ⓕ is 0.1 to 50 mols, preferably 1 to 20 mols. These components may be used either at a time or in several divided steps. The reaction temperature of the component (A) with the component (B) is in the range of $-40°$ to $+180°$ C., preferably $-20°$ to $+150°$ C., and the reaction time is 5 minutes to 5 hours, preferably 10 minutes to 3 hours in each step. The solid product (I) deposited by the reaction of the component (A) with the component (B) may be successively reacted with the component (C) in the next step, but it is preferred to once wash the product with an inert hydrocarbon solvent as already mentioned since the subsequent reaction is hindered by unreacted substances or byproducts present in the solution. Thus the solid product (I) having a shape of sphere or close to sphere is obtained.

Next, the component (C) will be described. This component (C) consists of the component ⓖ and/or the component ⓗ. The component ⓖ is a halogenated titanium expressed by the formula $TiX_q(OR^9)_{4-q}$ wherein X represents Cl or Br, $R^9$ represents an alkyl group or an aryl group each of 1 to 20 carbon atoms or a cycloalkyl group of 3 to 20 carbon atoms, and q represents a number of 1 to 4. Concrete examples thereof are $TiCl_4$, $TiBr_4$, methoxytitanium trichloride, ethoxytitanium trichloride, propoxytitanium trichloride, butoxytitanium trichloride, hexoxytitanium trichloride, octoxytitanium trichloride, phenoxytitanium trichloride, cyclohexoxytitanium trichloride, ethoxytitanium tribromide, butoxytitanium tribromide, dimethoxytitanium dichloride, diethoxytitanium dichloride, dipropoxytitanium dichloride, dibutoxytitanium dichloride, dioctoxytitanium dichloride, diphenoxytitanium dichloride, dicyclohexoxytitanium dichloride, diethoxytitanium dibromide, dibutoxytitanium dibromide, trimethoxytitanium chloride, triethoxytitanium chloride, tributoxytitanium chloride, triphenoxytitanium chloride, triethoxytitanium bromide, triphenoxytitanium bromide, etc. Titanium halides other than $TiCl_4$ or $TiBr_4$ may be prepared by reacting a titanium tetrahalide with an orthotitanic acid ester, but in the reaction of the step III, a mixture of a titanium tetrahalide with an orthotitanic acid ester may also be used in place of the above-mentioned reaction product. As the orthotitanic acid ester, the same orthotitanic acid esters as already mentioned may be used. Among these titanium halides, $TiCl_4$ is most preferable.

The component ⓗ is a halogenated vanadyl or a vanadium halide expressed by the formulas $VOX_s(OR^{10})_{3-s}$ or $VX_t(OR^{11})_{4-t}$ wherein X represents Cl or Br, $R^{10}$ and $R^{11}$ each represent an alkyl group or an aryl group each of 1 to 20 carbon atoms or a cycloalkyl group of 3 to 20 carbon atoms, s represents a number of 1 to 3 and t represents a number of 1 to 4. Concrete examples thereof are vanadyl trichloride, vanadyl tribromide, methoxyvanadyl dichloride, ethoxyvanadyl dichloride, butoxyvanadyl dichloride, phenoxyvanadyl dichloride, cyclohexoxyvanadyl dichloride, ethoxyvanadyl dibromide, dimethoxyvanadyl chloride, diethoxyvanadyl chloride, diphenoxyvanadyl chloride, diethoxyvanadyl bromide, vanadium tetrachloride, vanadium tetrabromide, methoxyvanadium trichloride, ethoxyvanadium trichloride, butoxyvanadium trichloride, phenoxyvanadium trichloride, cyclohexoxyvanadium trichloride, ethoxyvanadium tribromide, dimethoxyvanadium dichloride, diethoxyvanadium dichloride, dibutoxyvanadium dichloride, diphenoxyvanadium dichloride, diethoxyvanadium dibromide, triethoxyvanadium chloride, triphenoxyvanadium chloride, triethoxyvanadium bromide, etc. Among these halogenated vanadyls or vanadium halides, vanadyl trichloride and vanadium tetrachloride are preferred.

The component ⓖ and the component ⓗ may also be used in the reaction thereof with the solid product (I), in the form of a mixture and/or a reaction product of these components. Further, these components may also be used by diluting these in an inert hydrocarbon solvent as already mentioned.

Next, the reaction of the solid product (I) with the component (C) will be described.

This reaction of the step III may be carried out for example either by adding the component (C) to the solid product (I) suspended in an inert hydrocarbon solvent as already described or by adding the solid product (I) or its suspension to the component (C). The quantity of the component ⓖ or the component ⓗ used is 1 to 100 mols, preferably 3 to 50 mols per mol of an anhydrous magnesium dihalide as a raw material for constituting the solid product (I). The reaction temperature of the solid product (I) with the component (C) is 40° to 200° C., preferably 50° to 150° C., and the reaction time is 5 minutes to 5 hours, preferably 10 minutes to 3 hours. After the reaction, the resulting solids are separated by filtering off or decantation, followed by washing the solids with an inert hydrocarbon solvent to remove unreacted substances or byproducts to thereby obtain the solid product (II). The solvent used for the washing is a liquid inert hydrocarbon. Concrete examples thereof are aliphatic saturated hydrocarbons such as hexane, heptane, octane, nonane, decane, kerosine, etc. During and after the washing, it is necessary to make the solid product (II) coexistent with a liquid aliphatic saturated hydrocarbon as already described, in a qunntity of at least 50% by weight based on the product. As to the washing manner, decantation is particularly preferable, and after the washing, it is preferred that the hydrocarbon be coexistent with the solid product (II) at least in such a quantity that the solid product is immersed in the hydrocarbon. If the hydrocarbon is coexistent with the solid product (II) only in a quantity less than 50% by weight based on the solid product, then even when such a solid product (II) is combined with an organoaluminum compound and polymerization is carried out using the resulting combination, no sufficient catalytic performance is exhibited. Namely, the polymerization results are inferior as follows: the polymer yield and specific gravity are low, the particulate shape of polymer is inferior and the stereoregularity is low. The reason has not yet been clarified, but at any rate it is important to store the solid product (II) during and after the washing in the coexistence of a liquid aliphatic saturated hydrocarbon in a quantity of at least 50% by weight based on the solid product, and apply the resulting material to polymerization.

Next a process for producing α-olefin polymers will be described.

When the solid product (II) is combined as a solid catalyst component with an organoaluminum compound and an organic silicon compound component having a Si—O—C bond, a catalyst for producing α-olefin polymers can be obtained. As the organoaluminum compound to be combined, it is possible to use compounds expressed by the formula $AlX_rR^{12}_{3-r}$ wherein X represents Cl, $R^{12}$ represents an alkyl group or an aryl group each of 1 to 20 carbon atoms or a cycloalkyl group of 3 to 20 carbon atoms and r represents a number of 0 to 2. Concrete examples thereof are triethylaluminum, tri-n-propylaluminum, tri-i-butylaluminum, tricyclopentylaluminum, tricyclohexylaluminum, dimethylaluminum chloride, diethylaluminum chloride, di-n-butylaluminum chloride, ethylaluminum sesquichloride, ethylaluminum dichloride, etc. Among these, triethylaluminum alone or mixtures of two kinds of organoaluminum compounds such as triethylaluminum-tri-i-butylaluminum; triethylaluminum-diethylaluminum chloride; and triethylaluminum-ethylaluminum sesquichloride, or mixtures of three kinds of organoaluminum compounds such as triethylaluminum-tri-i-butylaluminumethylaluminum sesquichloride are preferred.

As the organic silicon compound component, it is possible to use compounds expressed by the formula $R^{13}_uSi(OR^{14})_{4-u}$ wherein $R^{13}$ and $R^{14}$ each represent an alkyl group or an aryl group each of 1 to 20 carbon atoms or a cycloalkyl group of 3 to 20 carbon atoms and u represents a number of 0 to 3.

Concrete examples thereof are methyl silicate, ethyl silicate, butyl silicate, methyltrimethoxysilane, methyltriethoxysilane, methyltriphenoxysilane, methyltribenzyloxysilane, methylethoxydimethoxysilane, methylphenoxydimethoxysilane, methylmethoxyphenoxysilane, ethyltrimethoxysilane, ethyltriethoxysilane, ethyltriphenoxysilane, ethyltribenzyloxysilane, ethylethoxydimethoxysilane, ethylmethoxydiethoxysilane, ethylphenoxydimethoxysilane, ethylmethoxyethoxyphenoxysilane, butyltrimethoxysilane, butyltriethoxysilane, benzyltrimethoxysilane, benzyltriethoxysilane, benzylphenoxydimethoxysilane, benzylmethoxyethoxyphenoxysilane, vinyltrimethoxysilane, vinyltriethoxysilane, cyclopropyltrimethoxysilane, phenyltrimethoxysilane, phenyltriethoxysilane, phenylmethoxydiethoxysilane, phenylmethoxyethoxyphenoxysilane, dimethyldimethoxysilane, dimethyldiethoxysilane, dimethyldiphenoxysilane, dimethyldibenzyloxysilane, dimethylmethoxyethoxysilane, dimethylmethoxyphenoxysilane, dimethylethoxyphenoxysilane, methylethyldimethoxysilane, methylethyldiphenoxysilane, methylphenyldimethoxysilane, methylphenyldiethoxysilane, methylphenyldiphenoxysilane, ethylphenyldimethoxysilane, ethylphenyldiethoxysilane, phenylbenzyldimethoxysilane, methylcyclopropyldimethoxysilane, methylvinyldimethoxysilane, trimethylmethoxysilane, trimethylethoxysilane, trimethylphenoxysilane, trimethylbenzyloxysilane, triethylmethoxysilane, triethylethoxysilane, triethylphenoxysilane, triphenylmethoxysilane, tribenzylmethoxysilane, dimethylethylmethoxysilane, dimethylphenylmethoxysilane, diethylmethylmethoxysilane, diethylmethyl phenoxysilane, diphenylmethylmethoxysilane, diphenylbenzylmethoxysilane, dimethylcyclopropylmethoxysilane, methylethylphenylmethoxysilane, methylethylphenylphenoxysilane, etc. Among these, methyltrimethoxysilane, methyltriethoxysilane, ethyltrimethoxysilane, phenyltrimethoxysilane, phenyltriethoxysilane, phenylmethoxydiethoxysilane, benzyltrimethoxysilane, methylethyldimethoxysilane, methylphenyldimethoxysilane, methylethyldiethoxysilane, methylphenyldiethoxysilane, methylbenzyldimethoxysilane, dimethyldimethoxysilane, diethyldimethoxysilane, diphenyldimethoxysilane, dimethyldiethoxysilane, trimethylmethoxysilane, triethylmethoxysilane and trimethylethoxysilane are preferred.

As to the combination manner of the solid product (II) with an organoaluminum compound and an organic silicon compound, the following three are illustrated:

① The components of the solid product (II), the organoaluminum compound and the organic solicon compound are independently fed into the reactor.

② A mixture component of the organoaluminum compound with the organic silicon compound and the solid product (II) are independently fed into the reactor.

③ A mixture of the components of the solid product (II), the organoaluminum compound and the organic silicon compound is fed into the reactor.

Any of these manners may be employed, Among these, however, the manner ① or ② is sometimes preferred. In the combination of these three components, the respective components or either one or two thereof may be dissolved or suspended in an aliphatic hydrocarbon such as butane, pentane, hexane, heptane, nonane, decane, kerosine, etc. and the resulting solutions or suspensions are used. In the case where the components are mixed in advance of feeding these into the reactor, as in the case of the manners ② and ③, the mixing temperature is in the range of $-50°$ to $+50°$ C., preferably $-30°$ to $+30°$ C., and the mixing time is in the range of 5 minutes to 50 hours, preferably 10 minutes to 30 hours.

The quantity of the organoaluminum compound used is in the range of 10 to 1,000 mols, preferably 50 to 500 mols per mol of Ti atom contained in the solid product (II) as a solid catalyst component. The quantity of the organic silicon compound used is in the range of 0.01 to 2 mols, preferably 0.05 to 1 mol per mol of the organoaluminum compound. If a mixture of organoaluminum compounds or a mixture of organic silicon compounds is used, it may be sufficient that the sum of the moles of the compounds falls within the above range.

Using the catalyst obtained by combining the solid product (II) as the solid catalyst component of the present invention, the organoaluminum compound and the organic silicon compound, α-olefin polymers are produced with α-olefins of 3 or more carbon atoms. Examples of these α-olefins of 3 or more carbon atoms are propylene, butene-1, pentene-1, hexene-1, octene-1, decene-1,4-methylpentene-1, 3-methylpentene-1, etc. The polymerization of these α-olefins include not only homopolymerization, but copolymerization thereof with at least one α-olefin of two or more carbon atoms. Examples of α-olefins of 2 or more carbon atoms are ethylene, butadiene, isoprene, 1,4-pentdiene, methyl1,4-hexadiene in addition to the above α-olefins of 3 or more carbon atoms. The quantity of these other α-olefins used is a quantity to be contained in the copolymer obtained by the copolymerization in a quantity of 50% by weight or less based thereon. The polymerization may be carried out either in liquid phase or in gas phase. When the polymerization is carried out in liquid phase, an inert hydrocarbon solvent such as hexane, heptane, nonane, decane, kerosine, etc. may be used as polymerization medium, but it is also possible to use α-olefins themselves as reaction medium. When the polymerization is carried out in gas phase, no reaction medium is used in principle, but the catalyst or either of the components may be dissolved or suspended in an inert hydrocarbon as described above and the resulting solution or suspension may be used. The polymerization is carried out by contacting an α-olefin with the catalyst in a polymerization vessel. The polymerization temperature is $40°$ to $200°$ C., preferably $50°$ to $150°$ C., and the polymerization pressure is the atmospheric pressure to 100 $Kg/cm^2G$, preferably 5 to 50 $Kg/cm^2G$. The polymerization may be carried out in either of batch, semi-continuous or continuous manner, but continuous polymerization is commercially preferred. Further, it is also possible to carry out the polymerization at a plurality of stages where polymerization conditions are varied. In order to control the molecular weight of polymer, addition of a molecular weight modifier such as hydrogen to the reaction system is effective.

The above-mentioned preparation and storage of the solid catalyst component, the preparation of the catalyst and the production of the polymer must be carried out in an atmosphere of an inert gas such as nitrogen or helium, but in some cases, it is also possible to carry out the above processes in an atmosphere of monomer or under vacuum condition.

The effectiveness exhibited in the present invention is as follows:

The polymer obtained according to the production process of the present invention is odorless, and at the time of granulation, exhausted gas from the vent part of the granulator and molten polymer at the exit of the granulator have almost no smell based on the organic acid ester component. This brings about economical advantages that polymer handling at the time of granulation is easy and there occurs no environmental pollution of staining the atmosphere.

Further, the catalyst obtained by combining the solid catalyst component of the present invention with an organoaluminum compound component and an organic silicon compound component has an extremely high polymerization activity so that it is unnecessary to remove the catalyst residue in the resulting polymer whereby the polymer purification is unnecessary and hence an extremely economical advantage is brought about. In addition, the stereoregularity of the resulting polymer is extremely high so that it is also possible to omit the step of removing amorphous polymer, which is economical. Further, the above solid product (II) used in the process of the present invention has a shape of sphere or close to sphere and it is possible to contol the average particle diameter to about 5 to about 60 μm. Thus the resulting polymer obtained by using the solid product (II) also has a shape of sphere or close to sphere, reflecting the shape of the solid product (II), and the quantity of fine powder polymer having particle diameters less than 100 μ is extremely small or nil. Due to these facts, long term-stabilized production and transportation of polymer are possible in the liquid phase polymerization process such as slurry polymerization or bulk polymerization or in the gas phase polymerization process, and it is also possible to make the production steps simpler than those of the prior art. These facts are very advantageous particularly in the polymer production according to the gas phase polymerization process. Since the polymer has a good particulate shape, its fluidity is good, and even in the case of copolymers, deterioration of the particulate shape and reduction in the bulk density are small and copolymer production is easy.

The definitions or measurement methods of various properties determining the resulting polymers in Examples and Comparative examples are as follows:

(1) Melt flow rate (abbreviated to MFR): according to ASTM D 1238 (L).

(2) Bulk density of polymer (abbreviated to BD): according to ASTM D 1895.

(3) Presence or absence of smell: judged according to an organoleptic test by 10 experimental persons, and classified into the following 4 stages of A~D:

A .. Odorless case where all of the ten persons judged that there was no smell.

B .. Case of a little smell where 1 to 4 persons among the ten judged that there was smell.

C .. Case of smell where 5 to 9 persons among the ten judged that there was smell.

D .. Case of strong smell where all of the 10 persons judged that there was smell.

(4) Shape observation of the solid product (I), the product (II) and the polymer: by means of an optical microscope.

(5) Particle diameter distribution of polymer: sought using sieves according to JIS Z 8801; the particle diameter distribution of the solid product (II) was sought using Micron Photosizer (SKC-2000 type, manufactured by Seishin Kigyo Co., Ltd.); and the particle diameter of cumulative 50% by weight on the cumulative particle size curve in the above particle diameter distribution is the average particle diameter.

(6) II: a proportion (%) of the weight of the extraction residue obtained after extracting a polymer with boiling n-heptane (98° C.) for 6 hours, based on the total weight of the polymer before the extraction.

(7) Quantity of fine powder: a proportion by weight (%) of the quantity of polymer having a particle diameter less than 100 μm, based on the total quantity of the polymer.

The present invention will be described below by way of Examples and Comparative examples.

EXAMPLE 1

(1) Preparation of solid catalyst component:

Purified decane (30 ml), anhydrous $MgCl_2$ (4.76 g), n-butyl orthotitanate (17 g) and 2-ethyl-1-hexanol (19.5 g) were mixed in a glass flask, followed by dissolving the mixture by heating to 130° C. with stirring for one hour to form a uniform solution, lowering its temperature down to room temperature, adding ethyl p-toluylate (3.7 g) and successively diethylaluminum chloride (0.42 g), thereafter heating the mixture to 70° C. for one hour, successively dropwise adding $SiCl_4$ (52 g) with stirring over 2.5 hours to deposit solids, further heating to 70° C. for one hour, separating the solids from the solution, and washing with purified hexane to obtain a solid product (I). The whole quantity of the solid product (I) was mixed with a solution of $TiCl_4$ (50 ml) dissolved in 1,2-dichloroethane (50 ml), followed by reacting the mixture with stirring at 80° C. for 2 hours to form a solid product (II), successively washing it with purified hexane, and adding purified hexane without drying to form a suspension of the solid product (II). The solid product (II) was present in a proportion of 30 g per l of the suspension. The above operations and similar ones in the succeeding Examples and Comparative examples were all carried out in nitrogen gas atmosphere.

The solid product (II) had a spherical shape, a narrow particle diameter distribution and an average particle diameter of 22 μm. The analytical results of the composition were as follows:

Ti 3.4% by weight (hereinafter abbreviated to %), Cl 56.9%, Mg 16.4%, Al 0.9%, Si 1.0%, ethyl p-toluylate 5.4%; butoxy group 3.9%; and ethylhexanoxy group 1.0%.

(2) Production of polypropylene:

Into a 3 l capacity stainless reactor provided with a multi-stage stirrer and purged wihh propylene gas were adeed triethylaluminum (2 mmols), phenyltriethoxysilane (0.5 mmol), the solid product (II) (0.01 mg atom as calculated in terms of Ti atom) and hydrogen (1.5 l), followed by carrying out polymerization while continuously feeding propylene at 70° C. for 2 hours so as to give a total pressure of 22 $Kg/cm^2G$, and thereafter discharging unreacted propylene to obtain powdery polypropylene (212 g). This polypropylene had a BD of 0.46 and a MFR of 6.5; the polymer particle has a shape close to sphere; and the quantity of fine powder having a particle diameter less than 100 μm was 0.06% by weight based on the total polymer particles. The proportion of the extraction residue with boiling heptane was 97.2%. The polypropylene was difficultly subject to attrition.

(3) Organoleptic test of smell:

Polypropylene just after polymerization had a smell of unreacted propylene; thus it was allowed to stand in nitrogen current at 50° C. for 3 hours, followed by subjecting the resulting polypropylene to the organoleptic test of smell. It had no smell of propylene and when 10 experimental persons carried out the organoleptic test of direct smelling, all of the persons judged that it was odorless (smell rank: A). Further, to the polypropylene after the organoleptic test were added an antioxidant (0.1% by weight) and a lubricant (0.1% by weight), followed by sufficiently blending the mixture in a Henschel mixer (tradename) and granulating the blend at 220° C. by means of a single-screw granulator having a vent part at its center. Three experimental persons judged that the gas exhausted at the vent part had a smell (smell rank: B), and all persons judged that the molten polymer at the exit of the granulator was odorless (smell rank: A).

COMPARATIVE EXAMPLE 1

Polyolefin production was carried out in the same manner as in Example 1, using the solid product (II) prepared in Example 1 as the solid catalyst component except that phenyltriethoxysilane of Example 1 was replaced by ethyl p-anisate, followed by subjecting the resulting polypropylene to the organoleptic test of smell. The results are shown in the Table listed later.

EXAMPLES 2~5

Example 1 was repeated except that n-butyl orthotitanate was replaced by n-butyl polytitanate (pentamer) (12 g) (Example 2); 2-ethyl-1-hexanol was replaced by n-heptanol (17.5 g) (Example 3); diethylaluminum chloride was replaced by triethylaluminum (0.40 g) (Example 4); and ethyl p-toluylate (3.7 g) was replaced by ethyl benzoate (3.4 g) (Example 5), to prepare the solid products (II). Using the solid products (II), polypropylene was produced and subjected to the organoleptic test of smell. The results are shown in the Table.

EXAMPLES 6~8

Solid products (II) were prepared in the same manner as in Example 1 except that in place of reacting with the uniform solution, ethyl p-toluylate, successively diethylaluminum chloride and successively SiCl₄, a product obtained in advance by mixing and contacting ethyl p-toluylate (3.7 g) with diethylaluminum chloride (0.42 g) in purified decane (5 ml) was added to the uniform solution at room temperature (Example 6); ethyl p-toluylate was added to the uniform solution at room temperature, followed by heating the mixture to 70° C. for one hour, thereafter adding SiCl₄ to deposit solids, further heating to 70° C. for one hour, returning the temperature to room one, adding diethylaluminum chloride and agitating the mixture at room temperature for one hour (Example 7); and ethyl p-toluylate, diethylaluminum chloride and SiCl₄ were at the same time added to the uniform solution over 30 minutes, followed by raising the temperature up to 70° C. over 2 hours and reacting the mixture at 70° C. for 2 hours (Example 8). Using the solid products (II), polypropylene was produced as in Example 1 except that phenyltriethoxysilane was replaced by diphenyldimethoxysilane, followed by carrying out the organoleptic test. The results are shown in the Table.

present in a proportion of 10 g in 100 ml of the suspension.

The solid product (II) had a spherical shape, a narrow particle diameter distribution and an average particle diameter of 18 μm. The analytical results of the composition were as follows: Ti 2.6%, Cl 57.2%, Mg 15.9%, Al 1.2%, Si 0.9%, ethyl benzoate 7.2%, ethoxy group 3.0% and octoxy group 0.7%.

Polypropylene was produced in the same manner as in Example 1 except that the solid product (II) of Example 1 was replaced by that of this Example and phenyltriethoxysilane was replaced by methylphenyldimethoxysilane, followed by carrying out the organoleptic test of smell. The results are shown in the Table.

COMPARATIVE EXAMPLES 2~5

Polypropylene was produced in the same manner as in Examples 2~5 except that phenyltriethoxysilane was replaced by ethyl p-anisate, followed by carrying out the organoleptic test of smell. The results are shown in the Table.

COMPARATIVE EXAMPLE 6

Polypropylene was produced in the same manner as in Example 9 except that methylphenyldimethoxysilane was replaced by methyl p-toluylate, followed by carrying out the organoleptic test of smell. The results are shown in the Table.

TABLE

Results of polypropylene production and organoleptic test of smell

| | Results of polypropylene production | | | | Results of organoleptic test | | |
|---|---|---|---|---|---|---|---|
| | Polymer yield g-polymer/mg Ti atom | BD g/ml | Amount of fine powder % | II % | Polymer powder | In granulation gas exhausted from vent part | Polymer at exit of granulator |
| Example 1 | 21,200 | 0.46 | 0.06 | 97.2 | A | B | A |
| Example 2 | 19,600 | 0.44 | 0.08 | 96.9 | A | B | A |
| Example 3 | 18,700 | 0.42 | 0.10 | 96.6 | A | B | B |
| Example 4 | 20,300 | 0.44 | 0.09 | 97.0 | A | B | A |
| Example 5 | 18,500 | 0.46 | 0.08 | 97.1 | A | B | A |
| Example 6 | 20,800 | 0.45 | 0.08 | 96.8 | A | B | A |
| Example 7 | 19,600 | 0.43 | 0.10 | 96.5 | A | B | A |
| Example 8 | 20,100 | 0.44 | 0.08 | 97.0 | A | B | A |
| Example 9 | 17,100 | 0.45 | 0.10 | 96.9 | A | C | B |
| Com. ex. 1 | 21,300 | 0.45 | 0.08 | 97.0 | C | D | C |
| Com. ex. 2 | 19,800 | 0.44 | 0.10 | 96.7 | C | D | C |
| Com. ex. 3 | 19,000 | 0.42 | 0.10 | 96.5 | C | D | C |
| Com. ex. 4 | 20,800 | 0.44 | 0.09 | 96.9 | C | D | C |
| Com. ex. 5 | 19,000 | 0.46 | 0.08 | 97.1 | C | D | C |
| Com. ex. 6 | 17,600 | 0.45 | 0.11 | 96.8 | C | D | C |

EXAMPLE 9

Purified nonane (50 ml), anhydrous MgCl₂ (4.76 g), ethyl orthotitanate (14.8 g) and n-octanol (16.3 g) were mixed in a stainless flask, followed by heating the mixture to 110° C. for 2 hours with stirring to form a uniform solution, lowering the solution temperature down to 70° C., adding thereto a product obtained in advance by contacting anhydrous aluminum chloride (1.5 g) with ethyl benzoate (3.4 g) by co-milling to dissolve the product therein, successively dropwise adding ethylsilicon trichloride (57 g) over 2.5 hours to deposit solids, further agitating at 70° C. for one hour, separating the solids from the solution and purifying with purified hexane to obtain a solid product (I). This solid product (I) was mixed with TiCl₄ (100 ml), followed by reacting the mixture at 110° C. for 1.5 hour with stirring to form a solid product (II), successively washing it with purified hexane, adding purified hexane without drying to form a hexane suspension. The solid product (II) was

What we claim is:

1. A process for polymerizing an olefin which comprises introducing into a polymerization zone
   at least one polymerizable olefin,
   a solid product (II),
   an organoaluminum compound, and
   an organic silicon compound having a Si—O—C bond and carrying out said polymerization at a temperature of 40°–200° C. and at a pressure of atmospheric to 100 Kg/cm² gauge
   (1) said organoaluminum compound component being triethyl aluminum and being present in a quantity of 10 to 1000 mols per Ti gram atom of said solid product (II);
   (2) said organic silicon compound being selected from the group consisting of phenyltriethoxysilane, diphenyldimethoxysilane and methylphenyldimethoxysilane and being present in a quantity of 0.01 to 2 mols per Al gram atom of said organoaluminum compound component; and (3) said solid product (II) having been prepared by the following three steps I, II and III:

I—mixing and dissolving ⓐ an anhydrous magnesium dihalide, ⓑ an orthotitanic acid ester selected from the group consisting of orthotitanic acid ethyl ester, n-butyl ester and polytitanic acid n-butyl ester (pentamer) and ⓒ a saturated alcohol selected from the group consisting of n-heptanol, n-octanol and 2-ethylhexanol, in an inert hydrocarbon solvent to obtain a component (A);

II—subjecting said component (A) to a mixing reaction with a component (B) consisting of ⓓ an aromatic monocarboxylic acid ester (hereinafter referred to as organic acid ester) selected from the group consisting of ethyl-p-toluylate and ethyl benzoate, ⓔ an aluminum compound selected from the group consisting of triethylaluminum, diethylaluminum monochloride and anhydrous aluminum chloride, and ⓕ a halogenated silicon selected from the group consisting of silicon tetrachloride and ethylsilicon trichloride, to thereby deposit a solid product (I), and III—reacting said solid product (I) with titanium tetrachloride (C) to obtain solid product (II);

said ⓐ, ⓑ and ⓒ being mixed and dissolved in an inert hydrocarbon solvent with stirring or shaking at a temperature of 50° to 150° C. under a pressure of 0 to 5 Kg/cm$^2$G and for a time of 10 minutes to 5 hours;

0.1 to 0.7 mol of said organic acid ester ⓓ, 0.1 to 0.04 mol of said halogenated aluminum ⓔ and 1 to 20 mols of said halogenated silicon ⓕ each being present based on one mol of said anhydrous magnesium dihalide as a raw material constituting said component (B), being mixed with said component (A) and the resulting mixture being reacted at a temperature of 0° to 130° C. under a pressure of 0 to 5 Kg/cm$^2$G and for a period of 10 minutes to 5 hours;

said solid product (I) being washed with an inert hydrocarbon solvent, the resulting washed product being mixed with titanium tetrachloride (C) so as to give a proportion of 3 to 50 mols of solid product (I) per mol of ⓐ, the resulting mixture being reacted at a temperature of 50° to 150° C. under a pressure of 0 to 5 Kg/cm$^2$G and for a time of 10 minutes to 3 hours, and the resulting solid product (II) being washed with a hydrocarbon solvent.

2. A process according to claim 1 wherein said olefin is propylene and the polymerization is carried out in gas phase.

* * * * *